United States Patent Office 3,023,136
Patented Feb. 27, 1962

3,023,136
CHIPWOOD ARTICLES OF HIGH COMPRESSIVE STRENGTH AND PROCESSES FOR PRODUCING THE SAME
Max Himmelheber, 132 Panoramaweg, Baiersbronn, Wurttemberg, Germany; and Gustav Hagen, 15 Rubensstrasse, and Otto Froede, 9 Alwin-Mittasch-Platz, both of Ludwigshafen (Rhine), Germany
No Drawing. Filed Dec. 17, 1957, Ser. No. 703,240
Claims priority, application Germany Dec. 17, 1956
17 Claims. (Cl. 154—45.9)

This invention concerns a new and improved method of making chipwood structures, more particularly structures of the chipboard type, which are especially light in weight and at the same time have a high compressive strength.

More specifically, this invention is concerned with the manufacture of chipwood structures of a porous type in which the pores are filled with, and the porous structure therefore stabilized by, porous plastics of compression-resistant properties.

This particular object of our invention is achieved by using a porous plastic of the said compression-resistant type, either exclusively or mainly, for filling and therefore stabilizing the hollow spaces in the chipwood structures and effecting the bonding of the wood chips or other vegetable raw materials if such were used, to one another or to the pore-filling plastic used by means of a binder. The technologically and economically important aspect of our invention is that it is now possible to produce chipboard and chipwood molded products, which despite of a very low specific gravity and a small expense of raw material have strength properties, which come up to fairly high technical requirements. The use of this type of chipwood made material has so far been frustrated mainly by unsatisfactory compressive strength of the material, the bending properties being sufficient for many purposes.

The process of our invention is this:

Wood chips are blended in a mixer in the usual way with any conventional binder. If the binder is an artificial resin in liquid form, it is sprayed on the chips, whereas artificial resins in powder form are added in certain predetermined quantities. Before, during, or after the addition of binder substance an expandable or expanded plastic is added, e.g. in the form of small beads, which expand during the subsequent molding process to which the molding material is subjected, thus filling the hollow spaces between the chips. They are bonded among themselves as well as to the binder.

In ordinary chipwood structures the efficiency of the binder depends on the specific gravity and the porous structure of the product, i.e. the lower the specific gravity, the lower the efficiency of the binder. The binder is effective only where it serves to link two chips. It has no gluing effect on the walls of the hollow spaces, which are merely lined by it. If, however, these hollow spaces are filled up by a plastic foam, which by the expanding process is pressed against the walls, the plastic foam is bonded to the binder. The result is a great increase in the compressive strength of the final product. Its three components become integral parts of a homogeneous substance.

For the manufacture of this type of chipboard less raw material is required per unit of volume—in absolute figures—than for the conventional type of chipboard.

Apart from that it is possible to use more chips and less binder without impairing the excellent mechanical properties of the product.

Under present technological conditions our process using three components is particularly important in the field of chipboard manufacture. In principle, however, the process is not restricted to organic chip or fiber materials. Mutatis mutandis it can be applied to inorganic materials, such as glass fibers, asbestos, or rock wool.

For the purposes of our invention wood is used in the form of wood chips. Wood from spruce, beech, lime, poplar, ash, pine, chestnut, gaboon, limba (afara-wood), or other trees is suitable. The chips should be between 4 and 18 mm. long, 1 and 20 mm. wide, and between 0.1 and 1.2 mm. thick with an optimum thickness of between 0.4 and 0.7 mm. As binding agents all binders suitable for gluing wood can be employed. We recommend polycondensation products in particular carbamide resins, preferably urea formaldehyde resins. They can be obtained in the usual way by reacting 1 mol of urea with about 1.5 to 3 mols of formaldehyde. The primary addition products can be used as well as the condensation products obtained with the formation of ether and/or methylene bridges, provided that they are substantially soluble in water. Generally speaking 1 part of the solid condensation product should be compatible with 1 part of water and form a solution. Other carbamide resins, i.e. polycondensation products from aldehydes with compounds having at least 1 carbamide group per molecule, can also be recommended. Such compounds forming carbamide resins are e.g. N-substituted urea, such as N-alkyl- or N-aryl urea, for instance N-methyl-, -ethyl-, -propyl-, -butyl- or -phenyl urea, also dicyandiamide, guanidine or urethanes. Polycondensation products from other aminoplasts-forming compounds, e.g. aminotriazines, in particular triaminotriazines (melamine) or triazines containing less than three amino groups, e.g. diaminotriazines and aldehydes will produce very good results, too. Usually formaldehyde or its polymers, e.g. paraformaldehyde, are used as aldehyde, but aldehydes of a higher molecular weight, such as acetic aldehyde, furfurol, propionaldehyde, and butyric aldehyde can also be employed for the aminoplasts-forming reaction in the usual way. The general practice is to add acid compounds as hardening agents to the polycondensation products from aminoplasts-forming compounds and aldehydes. These acids may be organic carboxylic acids or inorganic acids such as maleic acid, lactic acid, phthalic acid, formic acid, acetic acid, phosphoric acid, sulfuric acid or hyrochloric acid.

Especially advantageous as hardening agents are the salts of strong inorganic acids, in particular their water-soluble salts, e.g. alkaline salts, more even ammonium salts, e.g. of sulfuric acid, hydrochloric acid, nitric acid or phosphoric acid. The preferred practice is to apply the usual quantity of acid hardener, which is between 0.3 and 5% of the solid resin. Substances, which regulate, particularly retard, the hardening speed, e.g. urea, ammonia, urotropin or guanidine, may be added to either the hardener or the binder.

Another group of polycondensation products suitable as binding agents are the phenolic resins. They are obtained from phenol, its substitution products, e.g. of cresol or xylenol, or polyhydric phenols, such as resorcinol with aldehydes, in particular formaldehyde, also from fatty acid aldehydes of higher molecular weight. Like the aminoplasts the phenolic resins may be produced from mixtures of various phenoplasts-forming compounds and various aldehydes. The mixtures of several polycondensation products can also serve as binding agents. Phenolic resins can be used without hardener or hardened in the usual way with neutral acid or even alkaline compounds.

As an example of a neutral hardener we mention paraformaldehyde. Inorganic salts such as aluminum sulfate or organic acids such as γ-oxybutyric acid also fall into this category. Often lactones can be used with advantage, e.g. butyrolactone. Mixtures of hardening agents can also be employed. Normally aminoplasts as well as phenoplasts are used in an aqueous solution. Organic solvents, e.g. alcoholic solutions, can also be applied.

Apart from the polycondensation products mentioned adhesives of a different composition are also within the range of possibility. Reference is made to the unsaturated polyester resins, i.e. polycondensation products from ethylenically unsaturated polycarboxylic acids, in particular $\alpha,\beta$-ethylenically unsaturated $\alpha,\beta$-dicarboxylic acids such as maleic acid, and polyhydric alcohols, particularly glycol. Polyglycidyl ethers, called ethoxylene or epoxy resins, are also suitable. They can be hardened in the usual way with polyamines or polycarboxylic acids.

The procedure is this:

Wood chips are mixed with the binder and particles of either a still unexpanded and therefore compact, non-porous plastic, or expanded plastic particles. They may also be used at any intermediate stage of expansion. For brevity's sake they will be referred to as pre-expanded plastics hereinafter in the text. Particularly suitable among the plastics are expandable thermoplasts, preferably styrene polymers, e.g. polystyrene, or copolymers of predominant quantities of styrene and small quantities of another mono- or polyethylenicaly unsaturated compound, which is copolymerizable with styrene, such as acrylonitrile, vinyl chloride, vinyl carbazole, divinylbenzene or isobutylene. Generally the styrene polymer used should contain at least 50%, especially at least 80% of styrene. Other thermoplasts not based on styrene, such as expanded polyvinyl chloride, polyvinyl carbazole or polyethylene, can also be employed. Porous hardened polycondensation products, e.g. porous resins of aminoplasts-forming compounds and aldehydes as discussed in the paragraph on binders, are also suitable. So are porous phenolic resins as well as porous hardened materials of polyglycidyl ethers and the hardeners going with them. The binder should be such as to bind the chips among themselves as well as to the porous plastics.

The latter are produced in the usual way. For instance, in polymerizing or copolymerizing the monomeric compounds to produce the plastic to be employed, e.g. in polymerizing or copolymerizing styrene, organic liquids which have a swelling and an expanding effect are used, which are included in the polymer beads. Such expanding agents are aliphatic saturated hydrocarbons, e.g. pentane, hexane, heptane, octane, their mixtures (petroleum ether), or acetone in the case of polyethylene. These expanding agents can also be worked into the polymer after polymerization of the monomeric compound. Other suitable expanding agents are gaseous organic compounds such as low-molecular aliphatic hydrocarbons, particularly methane, ethane, propane or butane. Inert inorganic gases, such as nitrogen or carbon dioxide, or expanding agents that are decomposed at elevated temperatures, e.g. bicarbonates, such as sodium bicarbonate or diazo compounds, which, when decomposed, set free gases, can also be used. The particle size of both porous plastics and plastics that can be converted to a porous state can be changed within wide limits. If expanded plastic particles are used, their size generally lies between 0.9 and 15 mm. Partly pre-expanded particles have an optimum size of between 0.6 and 10 mm., non-expanded particles about 0.1 to 5 mm. The size of the particles depends on the measurements of the wood chips used so that the measurements given need not be adhered to.

The quantitative proportions used are the following:

Depending on the specific gravity, the composition of the wood, and the size and shape of the chips, 5 to 20 kg. per 100 kg. of wood chips of a solid binder will be used generally, especially 7 to 15 kg. The binder contains solid hardener (including retarding agents) in a proportion to solid resin of 0.01 to 15%, depending on its chemical composition and the desired hardening speed. The hardener will advantageously be used in dissolved form, in about 5 to 40% solution. It may also be added in solid form.

The porous plastics are added with advantage in quantities of between 0.5 and 5% by weight of the chips. The quantitative proportion can, however, be changed, because it depends on the specific gravity and the shape of the chips, and the weight per unit volume of the plastic particles. The figures given of 0.5 to 5% by weight, for example, refer to porous styrene polymer particles with a weight per unit volume of between 5 and 40 g./l.

The prepared mixture of chips, plastic particles and binder is then molded under heat and pressure in the ordinary type of presses or other machinery used in chipboard manufacture. Another possibility is to apply the binder and the expandable plastics to chips suspended in water, or to add these substances to a water-fiber mixture, which is then drained. In that case the three components are foamed and bonded in the subsequent drying process. If pre-expanded plastic particles are used the optimum molding temperature lies between 70° and 150° C. If the particles are not expanded, temperatures above 90° C. are advantageous. If unexpanded or partly expanded plastics are employed, care must be taken to ensure that the temperature in the press is high enough to develop the activity of the expanding agent and to expand the plastic completely.

If unexpanded, expanding-agent-containing polyvinyl carbazole is used as filler, higher molding temperatures are required, which lie between 170° and 190° C. If cured, porous polycondensation products, e.g. urea-formaldehyde resins, are used, the molding temperature lies between 110° and 180° C.

The idea of our invention will be apparent with greater detail from the following examples without, however, being restricted thereto.

The products manufactured according to the examples are chipwood structures with a specific gravity of about 0.25 in the case of the Examples 1 to 4, and a specific gravity of about 0.4 in the case of the Examples 5 to 9. The wood chips used as the basic material in Examples 1 to 8 are spruce flat chips 4 to 18 mm. long, 1 to 4 mm. wide, and 0.4 to 0.7 mm. thick. The said chips are obtained, by shredding, from chips 13 to 20 mm. long, 1 to 20 mm. wide, and 0.4 to 0.7 mm. thick. Chips of this latter non-shredded size are used in Examples 8 and 9. Examples 2, 3, 4, 6, 7 and 9 are concerned with chipboard manufacture according to the method of our invention, while Examples 1, 5 and 8 are given to show the properties of conventional chipboard with no addition of foamed plastics.

*Example 1*

4,000 g. of shredded spruce flat chips with a moisture contents of 4% are sprayed with 615 g. of a 50% solution of a urea-formaldehyde condensation product to which a proportionate amount of a hardening agent was added. The equipment used for the spray-treatment is a mixer fitted with a horizontally-arranged spiked shaft. The rotating shaft in this mixer throws the chips up thus producing a whirling mass into which the above-mentioned adhesive is sprayed in very small particles by means of compressed air with a spray-gun type appliance. 1,860 g. of the spray-treated chips are then filled by hand in a molding frame in which a light-metal plate serves as bottom part. The molding-frame charge is then levelled off and a second cold light-metal plate is placed on top of it. These light-metal plates have the function to support the adhesive-treated charge during the subsequent molding treatment. The charge is then precompressed in a cold press mainly to reduce its volume and to give the edges sufficient strength. The precompressed board is pressed with the light-metal plates for ten minutes in a hydraulic hot press, the heating plates of which have a temperature of 140° C. The press is under maximum pressure until the heating plates come to rest upon the spacers which regulate the thickness and thus the specific gravity of the board. The pressure is then allowed to drop off to 8 kg. per cm.$^2$ of the chipboard surface at the end of the molding operation. The chipboard is then removed from the press together with the covering plates which after cooling can be reused for the same purpose.

Chipboard manufactured in the manner described has a specific gravity of 0.27 with a thickness of the board of 18 mm. The flexural strength averages 12 kg./cm.$^2$.

*Example 2*

1,600 g. of shredded spruce flat chips are blended in a mixer with 400 g. of an expandable carbamide resin preexpanded to a volume of 20,000 cc. and then sprayed with 260 g. of a 50% solution of a urea-formaldehyde condensation product to which a proportionate amount of a hardener was added. This mixture of adhesive, carbamide resin and wood chips is filled in a molding frame in an amount of 1,860 g. and then further processed as described in Example 1.

Chipboard manufactured in this way has a specific gravity of 0.27 and a thickness of 17.8 mm. Its flexural strength averages 20 kg./cm.$^2$.

*Example 3*

1,600 g. of shredded spruce flat chips are mixed in a mixer with 240 g. of an expandable polystyrene plastic preexpanded to a volume of 20,000 cc. and then sprayed with 260 g. of a 50% solution of a urea-formaldehyde condensation product to which a proportionate amount of a hardener was added. This mixture of adhesive, plastic and wood chips is filled in a molding frame and further processed as described in Example 1.

Chipboard manufactured in this way has a specific gravity of 0.22 and a thickness of 21 mm. Its flexural strength averages 37 kg./cm.$^2$.

*Example 4*

In accordance with the process described in Example 1 chipboards are produced, for which 500 g. each of shredded spruce flat chips are used with no addition of expanding agent for the outer layers. For the intermediate layer 240 g. of polystyrene preexpanded to 20,000 cm.$^3$ is used, which is mixed with 860 g. of spruce chips. A chipboard structure of this composition contains 260 g. of a 50% urea-formaldehyde condensation product, to which a proportionate quantity of hardener is added. This type of 3-layer chipboard has a specific gravity of 0.26 and a flexural strength of 40 kg./cm.$^2$ with a board thickness of 18.8 mm.

*Example 5*

2,600 g. of shredded spruce flat chips are sprayed with 416 g. of a 5% solution of a urea-formaldehyde condensation product, to which a proportionate quantity of hardener was added. Of the sprayed chips 2,800 g. are molded into chipboards in the way described in Example 1 with only the molding time changed from 10 to 15 minutes. Chipboard manufactured in this way has a specific gravity of 0.41 and a flexural strength averaging 65 kg./cm.$^2$ with a board thickness of 18 mm.

*Example 6*

In the way described in Example 1 2,600 g. of shredded spruce flat chips are mixed with 36 g. of polystyrene preexpanded to 3,000 cc., and sprayed with 416 g. of a 50% solution of a urea-formaldehyde condensation product, to which a proportionate quantity of hardener is added, and then molded. The molding time is 15 minutes at a temperature of 140° C. Chipboard manufactured in this way has a flexural strength of 72 kg./cm.$^2$ and a specific gravity of 0.41.

*Example 7*

3,000 g. of shredded spruce flat chips are mixed with 50 g. of unexpanded, but expandable polystyrene and sprayed with 600 g. of a 50% solution of a urea-formaldehyde condensation product, to which a proportionate quantity of hardener was added. 2,960 g. of this mixture are molded at 145° C. for 18 minutes in the way described in Example 1. Chipboard manufactured in this way has a flexural strength of about 89 kg./cm.$^2$ with a thickness of 18 mm. and a specific gravity of 0.43.

*Example 8*

3,000 g. of non-shredded spruce flat chips are sprayed with 475 g. of a 50% solution of a urea-formaldehyde condensation product, to which a proportionate quantity of hardener was added. 2,850 g. of this mixture are filled in the molding frame and molded in the way described in Example 1 with only the molding time changed to 15 minutes. Chipboard manufactured in this way has a flexural strength of about 130 kg./cm.$^2$ with a thickness of 17.5 mm. and a specific gravity of 0.43.

*Example 9*

3,000 g. of non-shredded spruce flat chips are mixed in the mixer with 36 g. of polystyrene preexpanded to 3,000 cm.$^3$, then sprayed with 475 g. of a 50% solution of a urea-formaldehyde condensation product, to which a proportionate quantity of hardener was added. The rest of the process is the same as described in Example 1 with only the molding time changed to 15 minutes.

Chipboard manufactured in this way has a flexural strength of 180 kg./cm.$^2$ with a thickness of 18.5 mm. and a specific gravity of 0.43.

We claim:

1. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured polycondensation resin, the interstices between the bonded chipped wood particles being substantially filled with particles of an organic resin expanded into cellular form, which particles of organic resin are bonded in said article by said cured polycondensation resin to form a chipwood article with the chipped wood particles and the particles of the organic resin expanded into cellular form interbonded by said cured polycondensation resin.

2. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured aminoplast, the interstices between the bonded chipped wood particles being substantially filled by styrene polymer particles expanded into cellular form, which styrene polymer particles are bonded in said article by said cured aminoplast to form a chipwood article with the chipped wood particles and the expanded styrene polymer particles interbonded by said cured aminoplast.

3. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured phenoplast, the interstices between the bonded chipped wood particles being substantially filled by styrene polymer particles expanded into cellular form, which styrene polymer particles are bonded in said article by said cured phenoplast to form a chipwood article with the chipped wood particles and the expanded styrene polymer particles interbonded by said cured phenoplast.

4. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured polycondensation resin, the interstices between the bonded chipped wood particles being substantially filled with particles of an organic, thermoplastic resin expanded into cellular form and present in said chipwood article in an amount not exceeding 5% by weight of the chipped wood, which particles of said thermoplastic resin are bonded in said article by said cured polycondensation resin to form a chipwood article with the chipped wood particles and the particles of said thermoplastic resin expanded into cellular form interbonded by said cured polycondensation resin.

5. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured polycondensation resin, the interstices between the bonded chipped wood particles being substantially filled with particles of an organic, thermoplastic resin expanded into cellular form and present in said chipwood article in an amount not exceeding 5% by weight of the chipped wood, said thermoplastic resin being a polymerization product of at least one ethylenically unsaturated compound expanded into cellular form, which particles of said thermoplastic resin are bonded in said article by said cured polycondensation resin to form a chipwood article with the chipped wood particles and the particles of said thermoplastic resin expanded into cellular form interbonded by said cured polycondensation resin.

6. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured polycondensation resin, the interstices between the bonded chipped wood particles being substantially filled with particles of an organic resin expanded into cellular form, said particles of resin being a polycondensation product of an aminoplast-forming compound and an aldehyde hardened in cellular form, which particles of organic resin are bonded in said article by said cured polycondensation resin to form a chipwood article with the chipped wood particles and the particles of the organic resin expanded into cellular form interbonded by said cured polycondensation resin.

7. A chipwood article of high compressive strength comprising chipped wood particles having lengths in the range of 4–18 mm., widths in the range of 1–20 mm. and thicknesses in the range of 0.1–1.2 mm. bonded together as a fibrous mass by 5–20% by weight, based on the chipped wood, of a cured polycondensation resin, the interstices between the bonded chipped wood particles being substantially filled with particles of an organic resin expanded into cellular form, said particles of resin being a phenolic resin hardened in cellular form, which particles of organic resin are bonded in said article by said cured polycondensation resin to form a chipwood article with the chipped wood particles and the particles of the organic resin expanded into cellular form interbonded by said cured polycondensation resin.

8. A process for the production of pressed chipwood articles of high compressive strength which comprises mixing together wood chips having lengths in the range of 4–18 mm., widths in the range of 1–20 mm. and thicknesses in the range of 0.1–1.2 mm. with 5–20% by weight, based on the wood chips of a curable polycondensation resin, a curing agent for said curable polycondensation resin capable of curing and hardening said polycondensation resin under the application of heat, and small particles of an expandable to fully expanded organic resin, said organic resin being in a state of expansion ranging from an organic resin expandable under heat into cellular form to a resin fully expanded into cellular form, pressing the mixture of said wood chips, said polycondensation resin, said curing agent, and said organic resin particles into a chipwood article, and heating the pressed mixture to cure said polycondensation resin and to cause any expandable organic resin present in the pressed mixture to expand into cellular form and produce a chipwood article in which the wood chip particles are bonded together by the cured polycondensation resin with the interstices between said bonded wood chip particles being substantially filled with the expanded organic resin particles bonded in said chipwood article by said polycondensation resin, said organic resin being present in a sufficient amount to substantially fill said interstices between the bonded wood chips with said organic resin expanded into cellular form.

9. The process of claim 8 wherein said interstices between the bonded wood chips are substantially filled with said resin expanded into cellular form by mixing beads having a diameter between 0.1 and 10 mm. of a thermoplastic organic resin expandable upon heating into cellular form with said wood chips, said curing agent, and said curable polycondensation resin and heating the pressed mixture of said wood chips, said expandable thermoplastic resin, said curable polycondensation resin, and said curing agent to a temperature sufficient to expand said expandable thermoplastic resin into cellular form and substantially filled interstices between the bonded wood chips with the expanded resin.

10. The process of claim 9 wherein said beads are partially expanded to a diameter between 0.6 and 10 mm. before mixing thereof in said mixture.

11. The process of claim 8 wherein said small particles of said organic resin are beads of said organic resin fully expanded into cellular form to a diameter between 0.9 and 15 mm.

12. A process for the production of pressed chipwood articles of high compressive strength which comprises mixing together wood chips having lengths in the range of 4–18 mm., widths in the range of 1–20 mm. and thicknesses in the range of 0.1–1.2 mm. with 5–20% by weight, based on the wood chips, of a curable polycondensation resin, a curing agent for said curable polycondensation resin capable of curing and hardening said polycondensation resin under the application of heat, and small particles of a styrene polymer containing at least 50% styrene, which particles are expanded into cellular form, the expanded styrene polymers constituting 0.5–5% by weight of the wood chips, pressing the mixture of said wood chips, said polycondensation resin, said curing agent, and said organic resin particles into chipwood article, and heating the pressed mixture to cure said polycondensation resin and produce a chipwood article in which the wood chip particles are bonded together by the cured polycondensation resin with the interstices between said bonded wood chip particles being substantially filled with said expanded styrene polymer particles bonded in said chipwood article by said polycondensation resin, said expanded styrene polymer particles being present in sufficient amount to substantially fill said interstices between the bonded wood chips with said expanded styrene polymer.

13. The process of claim 12 wherein said curable polycondensation resin is an aminoplast.

14. The process of claim 12 wherein said curable polycondensation resin is a phenoplast.

15. The process of claim 8 wherein said small particles of said organic resin are small particles of a thermoplastic polymer of at least one ethylenically-unsaturated compound.

16. The process of claim 8 wherein said small particles of said organic resin are small particles of a cellular, hardened polycondensation product of an aminoplast-forming compound and an aldehyde.

17. The process of claim 8 wherein said small particles of said organic resin are small particles of a cellular, hardened phenolic resin.

References Cited in the file of this patent

UNITED STATES PATENTS

| | | |
|---|---|---|
| 2,376,653 | Boyer | May 22, 1945 |
| 2,446,304 | Roman | Aug. 3, 1948 |
| 2,787,809 | Stastny | Apr. 9, 1957 |
| 2,859,187 | Ropella | Nov. 4, 1958 |
| 2,881,088 | Schulenburg | Apr. 7, 1959 |

OTHER REFERENCES

"Dylite Expandable Polystyrene," pages 28 and 29, copyright 1954, Koppers Company Inc.